United States Patent [19]

Butz

[11] Patent Number: 5,895,991

[45] Date of Patent: Apr. 20, 1999

[54] ELECTRIC GENERATOR FOR BICYCLES

[75] Inventor: Hans Butz, Schwebheim, Germany

[73] Assignee: SRAM Deutschland GmbH, Schweinfurt, Germany

[21] Appl. No.: 09/080,029

[22] Filed: May 15, 1998

[30] Foreign Application Priority Data

May 15, 1997 [DE] Germany ............... 197 20 301

[51] Int. Cl.$^6$ ............... H02K 7/12; B62J 6/10; B62J 6/12
[52] U.S. Cl. ............... 310/75 C; 310/67 A
[58] Field of Search ............... 310/75 C, 67 A; 362/193

[56] References Cited

U.S. PATENT DOCUMENTS

| | | | |
|---|---|---|---|
| 4,636,670 | 1/1987 | Källström | 310/67 A |
| 5,115,159 | 5/1992 | Takamiya et al. | 310/67 A |

FOREIGN PATENT DOCUMENTS

| | | | |
|---|---|---|---|
| 90 02 898 | 7/1990 | Germany | B62J 6/12 |
| 93 00 311 | 6/1993 | Germany | B62J 6/12 |
| 260766 | 8/1949 | Switzerland | 310/67 A |
| 654818 | 6/1951 | United Kingdom | 310/67 A |

OTHER PUBLICATIONS

Fukuda, JP Abstract 3-057785, GPIC JPO Abstract Database, Mar. 31, 1991.
Chikamori et al., JP Abstract 7-242126, GPIC JPO Abstract Database, Sep. 19, 1995.

Primary Examiner—Nestor Ramirez
Assistant Examiner—B. Mullins
Attorney, Agent, or Firm—Cohen, Pontani, Lieberman & Pavane

[57] ABSTRACT

An electric generator assembly for supplying power to electrical devices on a bicycle. The electrical generator assembly includes a gearwheel fixedly secured and rotatively coupled to a bicycle wheel proximate a hub axis of the bicycle wheel, a rotor housing, an annular stator disposed within the rotor housing, and a rotor disposed concentrically within the annular stator. The electric generator assembly further includes an arm extending from the rotor housing and configured for detachable attachment with a portion of the bicycle frame proximate the hub axis of the bicycle wheel. The rotor is driven by a rotor-driving gear disposed outside the rotor housing. The rotor-driving gear is configured to mesh with an output gear of a gear train for transmitting power from the bicycle wheel. An input pinion, configured to mesh with the gearwheel, is rotatively coupled to the input gear of the gear train. A gearbox, dimensioned to house at least the gear train and the rotor-driving gear, includes a pivot bearing for hingedly connecting the gearbox to the rotor housing, so that the input pinion can be selectively engaged with the gearwheel mounted to the bicycle wheel by selectively pivoting the gearbox relative to the rotor housing.

11 Claims, 3 Drawing Sheets

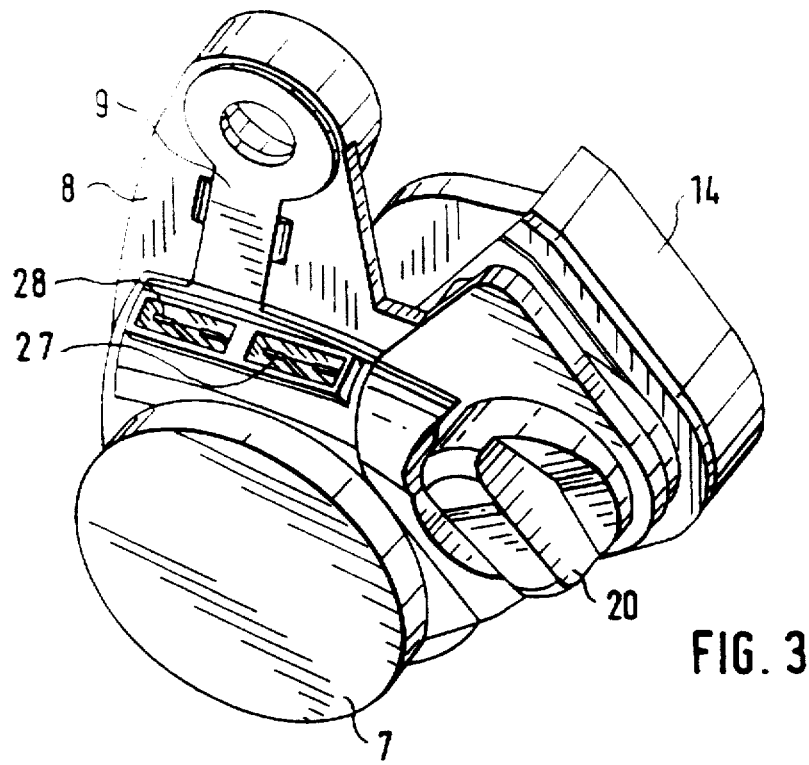
FIG. 3
FIG. 4
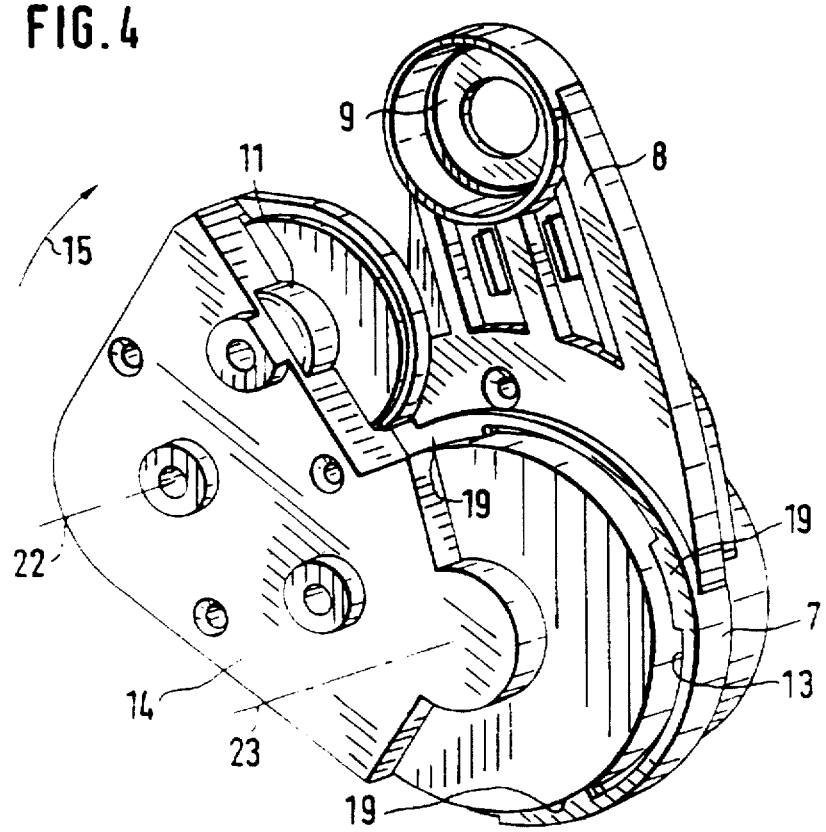

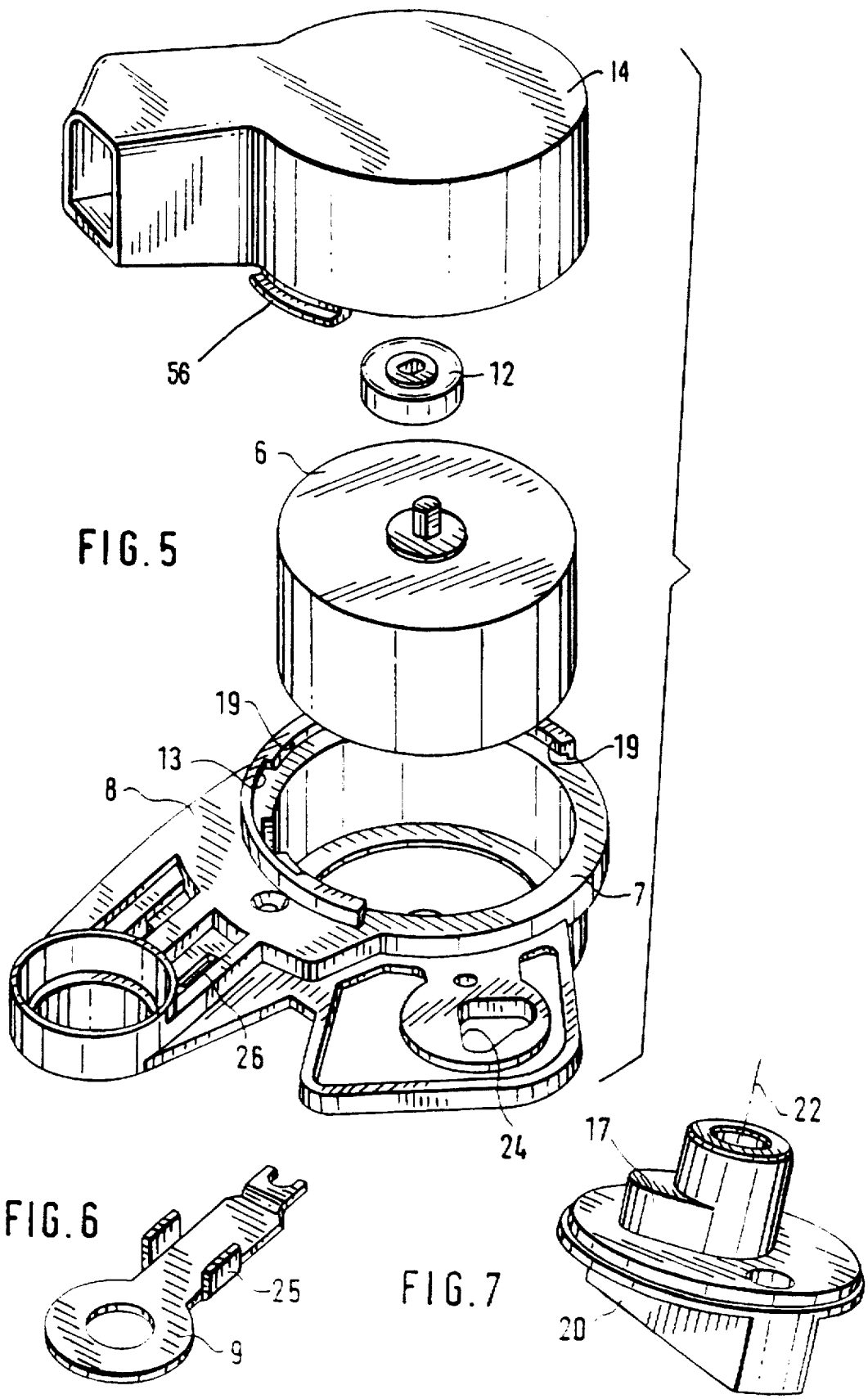

5,895,991

1

ELECTRIC GENERATOR FOR BICYCLES

BACKGROUND OF THE INVENTION

1. Field of the Invention

The present invention relates to electric generators for bicycles and, more particularly, to an electric generator assembly detachably securable to a bicycle wheel.

2. Description of the Related Art

Electric generators or dynamos such as, for example, hub dynamos and tire dynamos have been developed to supply electrical power to lighting devices installed on bicycles. Hub dynamos, as the name implies, are disposed within the hubs of bicycle wheels, typically the front wheels, and are typically installed during manufacturing of new bicycles. Because a hub dynamo forms an integral part of a wheel hub, an already assembled bicycle cannot be easily retrofitted with a hub dynamo without major modifications. Retrofitting is difficult for the additional reason that the hub dynamos must first be spoked into the wheels. Thus, in addition to the high manufacturing costs of hub dynamos, there are also high assembly costs for mounting them on the wheels.

Tire dynamos, on the other hand, are inexpensive and can be easily installed on already assembled bicycles; however, since these devices are frictionally driven by bicycle tires, they tend to increase tire wear and are relatively inefficient. Furthermore, the ability of the tire dynamos to generate electricity decreases when the tire becomes wet due to adverse weather conditions.

DE 90 02 898 U1 discloses a hub dynamo with a stator and an armature as its main components. The stator and armature rotate relative to each other in a hub which rotates about a stationary axis. A planetary gear system is arranged between the armature and the stator so that the armature rotates at a speed higher than that of the stator and in a direction opposite to that of the stator. The planetary gear system is selectively disengageable by a bicyclist.

Similarly, DE 93 00 311 U1 discloses a hub dynamo which forms an integral portion of a hub and is driven by a multiple planetary gear system. The planetary gear system can be engaged or disengaged through an inner coupling which is actuatable from outside the hub.

Accordingly, there is a need for a low-cost energy-efficient dynamo that can be easily installed on an already assembled bicycle.

SUMMARY OF THE INVENTION

Therefore, it is an object of the present invention to provide a low-cost energy-efficient electric generator for bicycles and which can be easily mounted to an assembled bicycle wheel.

Another object of the present invention is to provide an electric generator that is gear-driven by a bicycle wheel.

Still another object is to provide an electric generator which can be selectively activated depending on the needs of a bicyclist.

In a preferred embodiment, the electric generator assembly for supplying power to electrical devices on a bicycle includes a gearwheel fixedly secured and rotatively coupled to the bicycle wheel proximate a hub axis of the bicycle wheel, a rotor housing, an annular stator with a coil (or a plurality of coils) disposed within the rotor housing, and a rotor disposed concentrically within the annular stator so that rotation of the rotor relative to the annular stator causes a flow of electrical current in the annular stator. The electric generator further includes an arm extending from the rotor housing and configured for detachable attachment with a portion of the bicycle frame proximate the hub axis of the bicycle wheel. The rotor is driven by a rotor-driving gear disposed outside the rotor housing. The rotor-driving gear is configured to mesh with an output gear of a gear train for transmitting power from the bicycle wheel. An input pinion, configured to mesh with the gearwheel, is rotatively coupled to the input gear of the gear train. A gearbox is dimensioned to house at least the gear train and the rotor-driving gear and includes a bearing for pivotably or hingedly connecting the gearbox to the rotor housing, so that the input pinion may be selectively engaged with the gearwheel mounted to the bicycle wheel by selectively pivoting the gearbox relative to the rotor housing.

An advantage of the present invention is that the gear train includes a speed increasing gear and can be directly coupled to a gearwheel attached securely to the wheel through an input pinion. High efficiency, similar to those achieved by hub dynamos, can therefore be attained. A further advantage is that already-assembled bicycles, can be easily retrofitted with the inventive electric generator regardless of their equipment.

According to one aspect of the present invention, the electric generator has an arm, one end of which serves to clamp the electric generator to an inside surface of an end of a bicycle fork using wheel nuts. At another end of the arm, there is a rotor housing and a rotor contained therein. A gearbox with a gear or a gear train disposed therewithin is pivotably mounted to the rotor housing at one end of the gearbox. At another end of the gearbox, an input pinion is rotatably supported thereat which can be brought into gear-meshing engagement with the gearwheel mounted to the wheel. The electric generator can therefore be moved into and out of gear-meshing engagement by pivoting the gearbox inwardly and outwardly. The rotor can thus be driven directly by the wheel through the gear or gear train and operates without slippage at a predetermined speed-increasing translation ratio. Since the gearbox can be pivoted relative to the arm by only a few angular degrees, depending on the tooth depth of the engaging gearwheels, pivoting can thus be actuated by turning a cam against a reset spring. A remote control mechanism may also be provided, in case the bicyclists do not wish to bend down sideways to actuate the electric generator mounted in the vicinity of the hub or wheel axis.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 3 is a left perspective view of another embodiment of the present invention;

FIG. 4 is a right perspective view of the embodiment of FIG. 3;

FIG. 5 is an exploded view of the embodiment of FIG. 4;

FIG. 6 depicts an attachment bracket of the embodiment of FIG. 4; and

FIG. 7 depicts a cam of the embodiment of FIG. 4.

DETAILED DESCRIPTION OF THE PRESENTLY PREFERRED EMBODIMENTS

Figure 1:
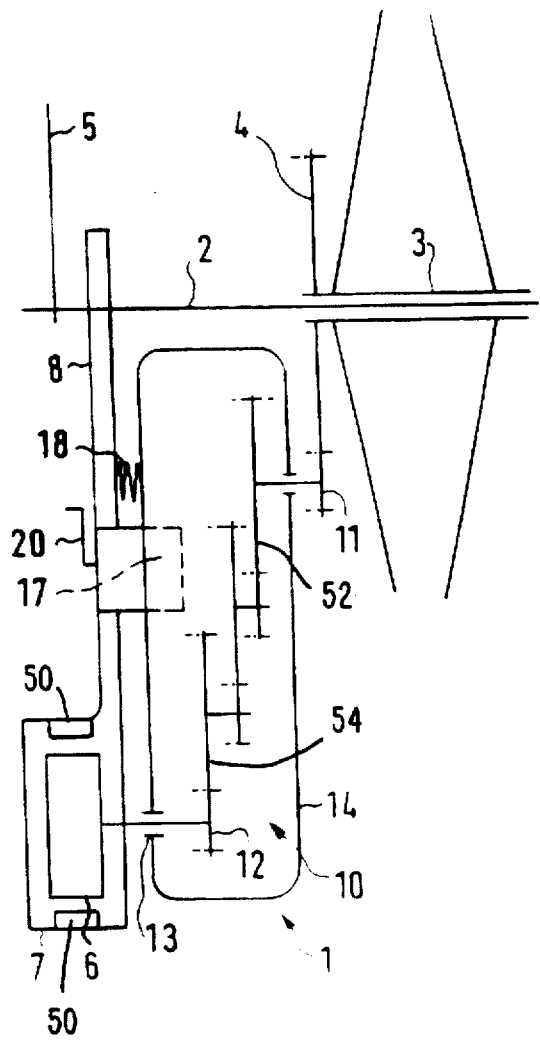
FIG. 1 schematically and sectionally illustrates a preferred embodiment of the electric generator assembly of the present invention.
Figure 2:
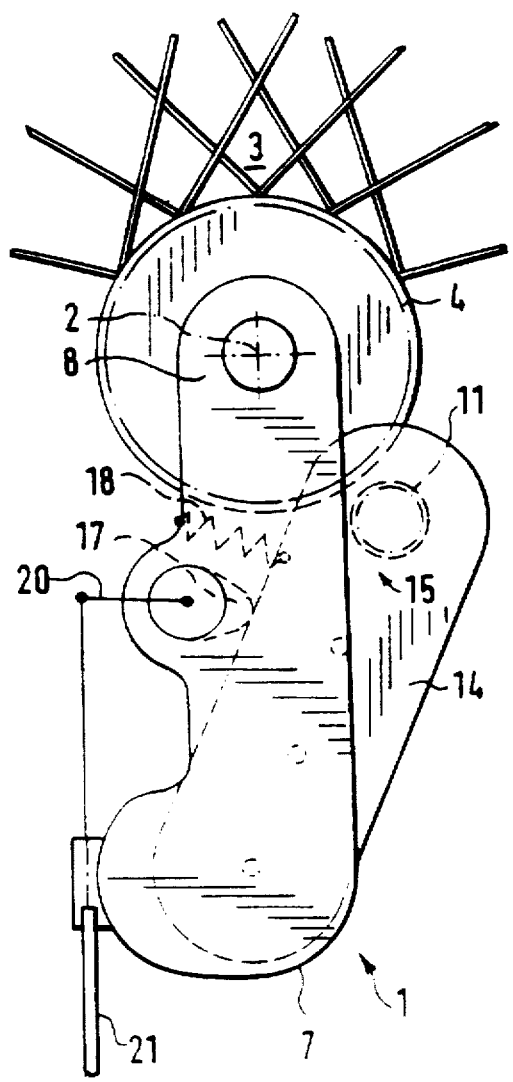
FIG. 2 schematically depicts a side view of the embodiment of FIG. 1.

Referring now to FIG. 1, there is shown schematically and sectionally a preferred embodiment of the electric generator assembly 1 of the present invention. The electric generator 1 includes a rotor 6 and an annular stator 50 disposed in a concentric relationship within a rotor housing 7 which is connected to a bicycle frame portion 5 proximate a hub axis 2 of a bicycle wheel 3 by an arm 8 extending radially from the rotor housing 7. The rotor 6 is preferably driven by the wheel 3 by a single gear (not shown) or preferably, a gear train 10 in a gearbox 14. The gear train 10 includes an input gear 52 and an output gear 54 arranged in a generally tandem relationship. The gear train 10 preferably provides a speed-increasing translation ratio relative to the rotational speed of the wheel 3. The input gear 52 is rotatively coupled to an input pinion 11. The angular momentum from the wheel 3 is transmitted to the input pinion 11 by a gearwheel 4 fixedly-attached to the bicycle wheel 3, through the gear train 10 in the gearbox 14 then to a rotor-driving gearwheel 12 rotatively coupled to the rotor 6. The gearbox 14 is hingedly or pivotably connected to the rotor housing 7 through a pivot bearing 13 provided by, for example, the outer walls of the gearbox 14 and the rotor housing 7, as will be described below As shown in FIG. 2, the gearbox 14 is pivotable relative to the arm 8 of the rotor housing 7 and is preferably resiliently urged against a cam 17, rotatably mounted on the arm 8 or gearbox 14, by a reset spring 18. The rotor 6 is set in motion only when the input pinion 11 is in gear-meshing engagement with the gearwheel 4 which is detachably secured to the wheel 3. In the position shown, the input pinion 4 and gearwheel 11 are disengaged from each other; thus, the rotor 6 would remain motionless even if the wheel 3 rotates, since the drive path between the gearwheel 11 and pinion 4 is interrupted.

FIGS. 2 and 7 show the gear teeth of gearwheels 11 and 4 are kept apart by the tip of the cam 17. When the cam 17 is rotated by approximately 90° using a switch or manual operating device 20 for manually operating the cam 17, the reset spring 18 urges the gearbox 14 to pivot and thus the input pinion 11 into gear-meshing engagement with the gearwheel 4 to a stop. The gearwheel 4 is preferably attached to the bicycle wheel 3 in such a way that the driving gearwheel 4 is centered and secured on centering means such as, for example, laterally projecting centering surfaces (not shown) disposed around the hub axis 2 of the bicycle wheel 3. If there is no centering means, the gearwheel 4 preferably includes attachment eyelets along its circumference, which eyelets can be connected to the spokes of the wheel 3 after the gearwheel 4 has been brought into a central position relative to the hub axis 2.

FIG. 3 depicts a perspective view of another embodiment of the electric generator 1 which is securable to the side of a bicycle, preferably at or proximate the hub axis of a rear bicycle wheel. The arm 8 extends from the rotor housing 7 and includes an attachment bracket 9 made of an electrically conductive metal, which is connected to the plastic rotor housing 7 and shaped as a ring with a hole that can be threaded onto the hub axis 2. This allows the electric generator 1 to be clamped together and detachably secured along the axis 2 of the wheel 3 by means of axial nuts provided at one of the two fork ends of the bicycle frame. The attachment bracket 9 is preferably made of a thin steel sheet so that mounting of the electric generator 1 does not significantly increase the spacing between the ends of the forks.

FIGS. 3–5 show the mounting of the gearbox 14 and a presently preferred construction of the pivot bearing 13. As depicted, the pivot bearing 13 preferably consists of several bayonet profiles 19 disposed circumferentially along and projecting radially inwardly from an outer wall of the rotor housing 7 and correspondingly configured bayonet closures 56 disposed circumferential along and projecting radially outwardly from an outer wall of the gearbox 14. The bayonet profiles 19 and bayonet closures 56 are shaped for interlockable engagement by sliding one over another. Since the pivoting area of the gearbox 14 for engaging and disengaging the input pinion 11 from the gearwheel 4 takes up only a few angular degrees around a pivot axis 23, the bayonet profiles 19 are so positioned and/or dimensioned that the gearbox 14 and the rotor housing 7 can be assembled or disassembled only when these housings 7, 14 are rotated clearly out of the pivoting area. In other words, the bayonet profiles 19 have a mounting position for interlockable engagement with the bayonet closures 56 that is located outside the pivoting area of the gearbox 14. Also shown is a cam axis 22 along which the switch 20 is mounted for pivoting the gearbox 14 and the rotor housing 7 by means of the cam 17, whereby the cam 17 is rotated toward an adjustment surface 24.

Referring to FIG. 2, a remote control device 21 is arranged in such a way that the switch 20 can be remotely rotated, controlled or actuated through a cable such as, for example, a Bowden cable so that the gearwheel 4 and input pinion 11 can be brought into or out of gear-meshing engagement via the cable. The Bowden cable may be connected to a control switch (not shown) so that the bicyclist can turn the electric generator 1 on or off while riding.

FIGS. 4–6 show the mounting of the attachment bracket 9 to the arm 8. The attachment bracket 9 has connecting tabs 25 which protrude through holes 26 defined in the arm 8 so that they can subsequently be bent or twisted. The attachment bracket 9 secured in this manner thus guarantees a perfect clamping seat for securing the electric generator 1 along the hub axis 2, after the attachment bracket 9 has been clamped between the lower ends of the forks of the bicycle frame 5. Because the attachment bracket 9 is made of electrically conductive material, a connection is simultaneously established with a ground or negative pole 27 which together with a positive pole 28 form at least one electrical connection port for the electrical devices on the bicycle. The positive pole 28 is connected to the coil of the stator 50 from which electric current or power is generated when the rotor 6 rotates relative thereto.

Furthermore, as depicted in FIGS. 5 and 7, the adjustment surface 24 is predeterminedly shaped to cooperate with the cam 17 of the switch 20 and which may define a housing opening.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. An electric generator assembly for supplying power to electrical devices on a bicycle, the bicycle having a frame and a wheel, the wheel having a hub axis, the generator assembly comprising:

a gearwheel fixedly securable to the bicycle wheel along the hub axis of the bicycle wheel;

a rotor disposed at a distance from the hub axis of the bicycle wheel;

gear means for transmitting power between the rotor and the wheel so that the rotor is rotatable at a speed faster than that of the wheel, the gear means including an input pinion configured to mesh with the gearwheel; and a gearbox for housing the gear means, the gearbox including means for pivotably connecting the gearbox to the rotor such that the input pinion is selectively engaged with and disengaged from the gearwheel by pivoting the gearbox relative to the rotor.

2. The electric generator assembly of claim 1, further comprising a rotor housing for housing the rotor, the rotor housing configured for detachable attachment to the bicycle frame along the hub axis of the wheel.

3. The electric generator assembly of claim 2, further comprising a cam rotatably mounted to one of the gearbox and the rotor housing, and a reset spring mounted between the gearbox and the rotor housing for resiliently urging the input pinion toward the gearwheel, wherein the cam has a disengagement position in which the gearwheel and the input pinion are disengaged from each other through rotation of the cam in a direction which causes the gearbox to pivot against a resilient force of the reset spring.

4. The electric generator assembly of claim 3, wherein the cam has an engagement position in which the reset spring is permitted to resiliently urge the input pinion to engage with the gearwheel through rotation of the cam.

5. The electric generator assembly of claim 2, wherein the gearbox has a pivoting area and the means for pivotably connecting the rotor to the gearbox comprises a pivot bearing which includes a bayonet closure and a bayonet profile, the bayonet profile having a mounting position, located outside the pivoting area of the gearbox, for interlockable engagement with the bayonet closure.

6. The electric generator assembly of claim 2, further comprising an arm extending from the rotor housing for attachment to the bicycle frame along the hub axis of the wheel.

7. The electric generator assembly of claim 6, further comprising axial nuts, wherein the arm is configured to be clamped between a fork of the frame and a hub of the bicycle wheel by the axial nuts.

8. The electric generator assembly of claim 6, wherein the gearbox and the rotor housing are made of a plastic material.

9. The electric generator assembly of claim 6, wherein the arm includes an attachment bracket at a clamping point proximate the hub axis, the attachment bracket being made of an electrically conductive material.

10. The electric generator assembly of claim 3, further comprising a switch connected to the cam for manual rotation of the cam.

11. The electric generator assembly of claim 3, further comprising a remote control cable connected to the cam so that the cam can be rotated remotely.

* * * * *